R. E. HELLMUND.
SYSTEM OF CONTROL.
APPLICATION FILED OCT. 13, 1917.

1,361,995.

Patented Dec. 14, 1920.

WITNESSES:

INVENTOR
Rudolf E. Hellmund.
BY
ATTORNEY

R. E. HELLMUND.
SYSTEM OF CONTROL.
APPLICATION FILED OCT. 13, 1917.

1,361,995.

Patented Dec. 14, 1920.
3 SHEETS—SHEET 3.

WITNESSES:
J. T. Wurmb.
W. R. Coley

INVENTOR
Rudolf E. Hellmund.
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,361,995.  Specification of Letters Patent.  Patented Dec. 14, 1920.

Application filed October 13, 1917. Serial No. 196,391.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Systems of Control, of which the following is a specification.

My invention relates to systems of control and especially to the automatic regulation of electric-vehicle motors and the like, under predetermined operating conditions.

Various systems have heretofore been proposed for protecting the main machines, during regenerative operation, by providing them with relatively "steep" speed-current characteristics; that is, the machine current varies but little over a relatively wide range of vehicle speed. Such inherent regulation is advantageous with respect to the prevention of "flash-over" difficulties, but undesirable relations of speed and torque values are produced during certain speed ranges.

It is one object of my present invention, therefore, to provide automatic means, preferably in the form of a torque-relay device, for properly regulating systems of the class in question to inherently prevent such undesirable speed-torque relations, as hereinafter set forth in detail.

More specifically stated, it is an object of my invention to provide, in a system of the class under consideration, automatic relay devices for limiting the machine torque and speed, together with a manual controller having an initial group of positions for adjusting the relay devices to effect relatively low machine torque and speed operation and having a succeeding group of positions for adjusting the relay devices to effect relatively high machine torque and speed operation.

Other minor objects of my invention will become apparent from the following detailed description, and are pointed out with particularity in the appended claims.

My invention may best be understood by reference to the accompanying drawings, wherein.

Figure 1:
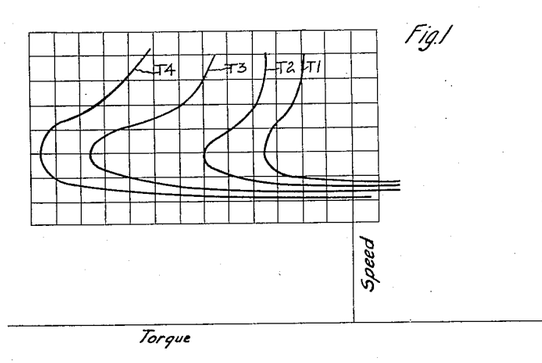
Figure 1 is a curve chart illustrating the speed-torque characteristics of the regenerative machines that are shown in Fig. 2 and in Fig. 3 when not provided with the automatic regulation of the present invention.
Figure 2:
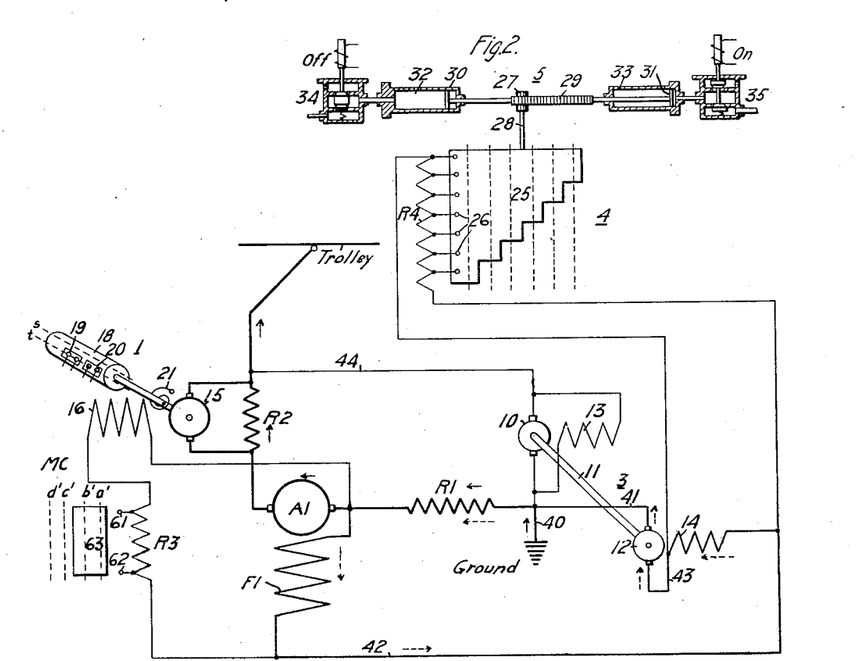
Fig. 2 is a diagrammatic view of the main circuits of a system of control embodying the invention.

Referring to Fig. 1 of the drawings, the curve chart, having abscissæ corresponding to torque values and ordinates corresponding to speed values, embodies a plurality of characteristic curves T1, T2, T3 and T4 representing the regenerative operation of the main machines that are illustrated in Fig. 2 and in Fig. 3, in accordance with the setting of a certain regulating resistor, as hereinafter more fully set forth. In the systems to be described, manual and also automatic means are provided for effecting a transfer of the main-machine speed-torque characteristics from one curve to another during regenerative operation. In this way, the main-machine torque or braking effort may be increased or decreased at will.

However, assuming that the main machine is operating in accordance with the upper relatively "steep" portion of the curve T4, whereby the torque produced reaches a maximum safe value under the concurrent operating conditions, if the vehicle speed is reduced by reason of such relatively heavy braking effort, it will be observed that the torque thereby tends to increase, as indicated by the loop portion of the curve T4. However, as just mentioned, such operation would cause the regenerative machines to produce a dangerously high torque and current and, consequently, the automatic relay means to be described in connection with the succeeding figures are provided to prevent the main-machine torque from exceeding a safe value, under the conditions assumed.

Referring now to Fig. 2, the system shown comprises supply-circuit conductors Trolley and Ground; a main dynamo-electric machine having a commutator-type armature A1 and a field winding F1 of the series type; an auxiliary motor-generator set 3 that is fed from the supply circuit for the purpose of exciting the main field winding F1; a plurality of resistors R1 to R4, inclusive, that are connected in various machine circuits in a manner to be hereinafter set forth; a controller 4 for varying the active circuit value of the resistor R4 in accordance with the movements of an actuating mechanism 5; a torque relay device 1 for automatically varying the main-machine excitation under predetermined conditions; and a master controller MC, which is more completely shown in Fig. 4, for the purpose of manually adjusting the torque relay device.

The motor-generator set 3 is shown as comprising a motor or driving armature 10 which is coupled by a shaft 11, for example, to an exciting or generator armature 12. The auxiliary armatures are provided with suitable field windings: a shunt field winding 13 for the driving armature 10 and a series-related field winding 14 for the exciting armature 12 being shown in the figure. The variable resistor R4 is connected in parallel relation to the field winding 14 for the exciting armature 12 and thus serves to vary the exciting-armature voltage and, therefore, the main-field-winding excitation.

The torque relay device 1 comprises a commutator-type armature 15 that is connected in parallel relation to the main-circuit resistor R2, and a field winding 16 that is connected through the variable resistor R3 across the main field winding F1. The relay shaft 17 carries a small drum or cylinder 18 upon which is mounted a plurality of contact segments 19 and 20 for closing certain auxiliary circuits to be described in connection with Fig. 4, in accordance with the occupation of its positions $s$ and $t$ by the relay device. A suitable spring 21 is provided for normally biasing the relay 1 to its position $t$, and, under relatively heavy torque conditions of the main machine, as reflected in the conjoint action of the relay armature and field winding, the relay device is actuated to its position $s$, in opposition to the action of the spring 21. It will be understood that by manually varying the active circuit value of the resistor R3 by the master controller MC, the setting of the torque relay device, that is, the main-machine torque value to which it will respond by movement to position $s$, may be regulated.

The controller 4 is preferably of the familiar drum type, comprising a multi-position contact segment 25 that is adapted to become successively disengaged from a plurality of control fingers 26 as the controller is moved in a forward direction, to thus insert gradually increasing values of the resistor R4 in parallel relation to the field winding 14 for the exciting armature 12 to increase the value of the exciting voltage and thus compensate for the decrease of vehicle speed during the retardation period.

The actuating mechanism 5 is of a familiar electrically-controlled, pneumatically-operated type comprising a pinion 27, which is secured to the operating shaft 28 for the controller 4 to mesh with a horizontally-movable rack member 29, the opposite ends of which constitute pistons 30 and 31 that travel within appropriate operating cylinders 32 and 33, respectively. A normally open valve 34, having an actuating coil "Off," communicates with the outer end of the cylinder 32, while a normally closed valve, having an actuating coil "On," is associated with the outer end of the other cylinder 31. Fluid pressure from any suitable source (not shown) is conveyed to the valves 34 and 35, thus normally biasing the mechanism to the illustrated position.

The mechanical operation of the apparatus just described may be set forth as follows: upon concurrent energization of actuating coils Off and On, the initial unbalanced fluid-pressure conditions in the apparatus are reversed, that is, fluid pressure is admitted to the cylinder 33 through the valve 35 and is released from the other cylinder 32 through the valve 34 to the atmosphere. Consequently, movement of the pistons and of the controller 4, to the left in the illustrated case, ensues. To arrest such movement, at any time, it is merely necessary to deënergize the Off coil, whereupon balanced high-fluid-pressure conditions obtain in the mechanism and a positive and reliable stoppage thereof is effected.

To produce return movement of the device, the actuating coils Off and On are concurrently deënergized, whereby fluid-pressure conditions revert to the original unbalanced state and the desired backward movement is effected.

Assuming that the system is operating under normal regenerative conditions, the regenerative or main-armature circuit, indicated by the solid arrows, is established from the supply-circuit conductor Ground, through conductor 40, stabilizing resistor R1, main armature A1, shunting resistor R2 for the torque relay 1, and thence to the trolley.

The exciting or main-field-winding circuit, indicated by the dotted arrows, is established from the positive terminal of the exciting armature 12, through conductor 41, stabilizing resistor R1, main field winding F1, conductor 42, auxiliary field winding 14, and conductor 43 to the negative terminal of the exciting armature 12.

An auxiliary circuit is completed from the trolley through conductor 44, auxiliary driving armature 10, and conductor 40 to ground.

The circuit connections just traced are not of my present invention, but are fully set forth and claimed in my copending application, Serial No. 44,443, filed August 9, 1915, and only a general description of the inherent stabilizing action of the resistor R1 will be given here. It will be observed that the regenerative current and the exciting current traverse the stabilizing resistor R1 in the same direction during the retardation period. Consequently, an incipient increase of main-armature current immediately produces a correspondingly augmented voltage drop in the stabilizing resistor R1 to thus reduce the voltage available for delivery to the main field winding F1 from the exciting armature 12. In this way, the main-armature current is immediately caused to subside to the normal value. The converse action takes place in the event of an incipient decrease of regenerated current, as will be understood, and thus the resistor R1 inherently functions to compensate for normal fluctuations of supply-circuit voltage and similar conditions.

It will be appreciated that the selected value of the stabilizing resistor R1 will partly determine the inherent "steepness" of the speed-current characteristic for the main machines and, in addition, the regulation of the resistor R4 serves to effect a change of the main-machine operating characteristics from one to another of the speed-torque curves that are illustrated in Fig. 1. If desired, the stabilizing resistor R1 may be varied to compensate for the decrease of vehicle speed in lieu of the regulation of the resistor R4, although the illustrated arrangement of circuits is preferred.

Figure 4:
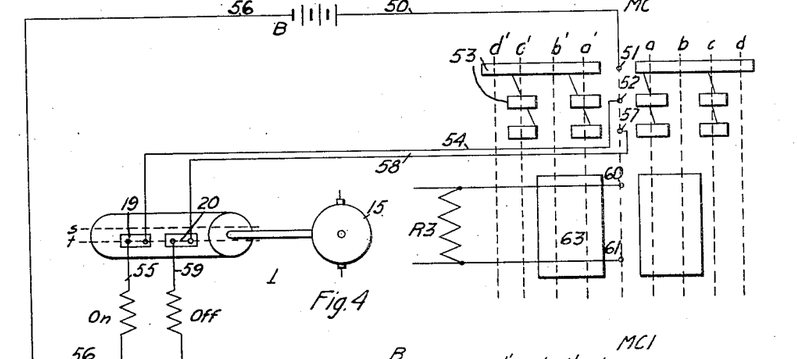
Fig. 4 and Fig. 5 are diagrammatic views of auxiliary governing systems corresponding, respectively, to Fig. 2 and to Fig. 3.

Referring to the corresponding auxiliary governing system of Fig. 4, the illustrated circuits comprise the actuating coils On and Off and the contact members of the torque relay device 1, together with the complete master-controller contact segments for primarily governing the operation of the system, and an auxiliary source of energy, such as a battery B.

Although the present system is adapted for both accelerating and regenerative operation, it is considered that the invention will be thoroughly understood from a description of the operation during the retarding period only. Assuming, therefore, that the main machine is coasting, under suitable speed conditions, and that it is desired to effect regenerative braking, the master controller MC may be actuated to its initial regenerative position $a'$, whereby a common auxiliary circuit is established from the positive terminal of the battery B through conductor 50 to control fingers 51 and 52, which are bridged by contact segment 53 of the master controller, whence circuit is continued through conductor 54, contact segment 19 of the torque relay device 1 in its normal position $t$, conductor 55, actuating coil On and conductor 56 to the negative battery terminal.

A similar circuit is completed from the contact segment 53 through control finger 57, conductor 58, contact segment 20 of the torque relay device 1, conductor 59 and the actuating coil Off to the negative conductor 56.

Since the actuating coils On and Off are concurrently energized, forward movement of the controller 4 occurs to gradually insert more and more of the regulating register R4 in circuit. However, it will be observed that in positions $a'$ and $b'$ of the master controller, a plurality of control fingers 60 and 61, which are connected to different points of the resistor R3, are bridged by a contact segment 63, whereby the resistor R3 is short-circuited. In this way, the relay field winding 16 is strongly energized to permit movement of the relay device to its position $s$, under medium or relatively low torque conditions of the main machine.

When such actuation of the relay device to its position $s$ occurs, the energizing circuits for the actuating coils On and Off are both interrupted and, consequently, backward movement of the controller 4 occurs, in accordance with previously-explained principles, to thereby effect a decrease of the main-machine torque. Thus, the main machine is automatically operated under medium or relatively low torque conditions, since the master controller occupies its position $a'$. This action is particularly advantageous in the case of locomotive control where a large number of vehicles are to be hauled, since the "slack" may be gradually taken out of the train, thus preventing heavy surges of machine current and also obviating the liability of breakages of couplings, etc., between the various vehicles, as will be understood.

The main-machine torque may be manually reduced at any time during such "slack"-removing period by actuating the controller to its position $b'$, whereby control fingers 52 and 57 become disengaged from the contact segment 53 to deënergize the On coil and the Off coil, respectively, and produce the previously-mentioned backward or torque-reducing movement of the controller 4.

After the "slack" has been removed from the train, the master controller MC may be actuated to its position $c'$, whereby the short-circuit of the resistor R3 is wholly or partially removed to correspondingly weaken the field excitation for the relay device 1 and thus cause the device to be actuated to its position $s$ only under relatively high torque conditions of the main machine, corresponding to the previously-mentioned loop portion of the curves shown in Fig. 1. The machine torque may again be manually reduced by actuation of the master controller to its position $d'$ to deënergize the actuating coils On and Off.

It will be seen that I have thus provided a relatively simple control system for manually governing the removal of "slack" from a train, the maximum main-machine torque under such conditions being automatically limited to a medium or relatively low value, while, after the "slack" has been entirely taken up, the main-machine torque may again be manually governed, and the automatic control thereof occurs only under dangerously high torque values corresponding, for example, to the skidding-point of the vehicle wheels.

Figures 3, 6:
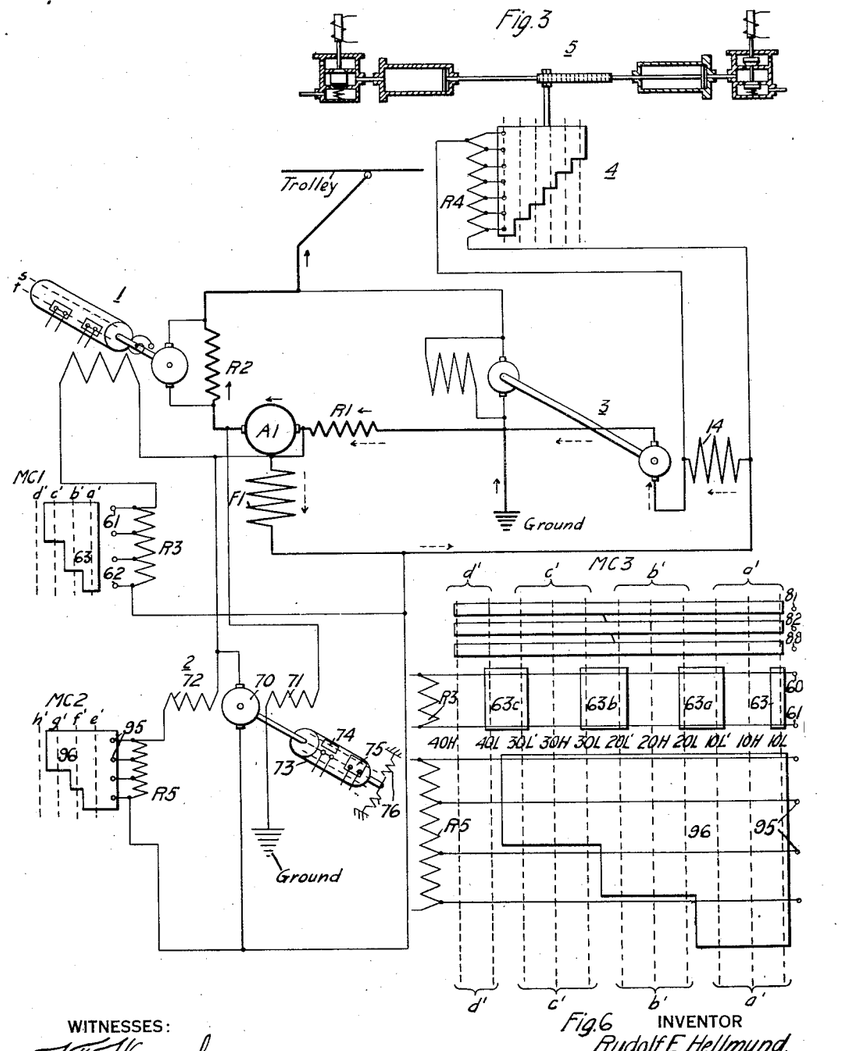
Fig. 3 is a similar view of a modified form of my invention.
Fig. 6 is a diagrammatic view of a partial modification of the system that is shown in Fig. 5.

Reference may now be had to Fig. 3, wherein an automatic speed-controlling apparatus, in addition to the torque relay device 1, is illustrated in connection with the supply-circuit, main dynamo-electric machine and motor-generator set 3, as previously described.

The speed-regulating device or relay 2 is of the torque-motor type, comprising a commutator-type armature 70 that is connected across the main-field winding F1 and a plurality of differentially-related field windings 71 and 72 that are respectively energized in accordance with the supply-circuit voltage and with a main-field-winding voltage. With a given supply-circuit voltage, a certain field strength in the main machine always corresponds to a definite speed, for the following reason. In any machine, the induced counter voltage is proportional to the product $$\text{Speed} \times \text{field flux} = \text{C. E. M. F.}$$

Furthermore, the C. E. M. F. is substantially equal to the impressed voltage, E. Therefore, $$E = \text{speed} \times \text{field flux}.$$

or $$\text{field flux} = \frac{E}{\text{speed}}.$$

Since E is constant, under present assumptions, it follows that there is a fixed field value for a given speed. Consequently, the action of the relay device 2 will depend upon the main-machine speed and will tend to maintain such speed substantially constant by balancing the concurrent values of main-machine voltage and supply-circuit voltage in accordance with the adjustment or setting of the relay device. To provide such adjustment, a resistor R5, which may be varied in steps by a master controller MC2, is shown as connected in series relation with the relay field winding 72.

The relay device 2 also comprises a small drum or cylinder 73, upon which are mounted a plurality of contact segments 74 and 75 for closing certain auxiliary circuits, to be described in connection with Fig. 5, in accordance with the particular position $x$, $y$ or $z$ that the relay device occupies. A plurality of centering springs 76 normally bias the device to the illustrated intermediate position $y$.

By varying the active circuit value of the resistor R5, the balancing of the differential field excitations in the relay device occurs at different current values, whereby the main-field winding excitation is correspondingly varied to maintain different values of main-machine speed. It will be understood that various other arrangements may be provided for automatically regulating the main-machine speed or for varying the action of the speed relay 2.

Since the remainder of the circuits shown in Fig. 3 are substantially identical to those set forth in Fig. 2, no extended further description thereof is deemed necessary here. The torque-regulating resistor R3 is shown as adapted for variation in a greater number of steps than previously described to provide a correspondingly greater number of main-machine torque settings, which may be desirable in some cases. A master controller MC1 may be employed for this purpose.

Figure 5:
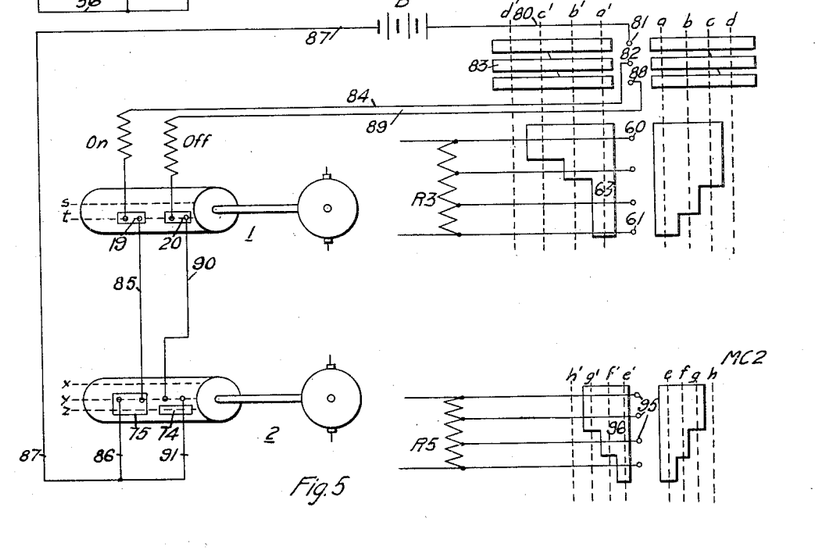

Referring, therefore, to Fig. 5, the auxiliary governing system shown comprises the actuating coils On and Off, and the auxiliary contact members of the torque relay 1 and of the speed relay 2; together with master controllers MC1 and MC2 for primarily governing the operation of the system, including regulation of the resistors R3 and R5; and an auxiliary source of energy, such as the battery B.

Assuming that the relay devices 1 and 2 occupy the illustrated normal positions, and that the master controller MC1 is actuated to its initial regenerative position $a'$ during the coasting period of the main machine, an auxiliary circuit is established from the positive terminal of the battery B through conductor 80, control fingers 81 and 82 which are bridged by contact segment 83, conductor 84, actuating coil On, contact segment 19 of the torque relay 1 in its position $t$, conductor 85, contact segment 75 of the speed relay 2 in either of its positions $y$ or $z$, and conductors 86 and 87 to the negative battery terminal.

A similar circuit is completed from the contact segment 83 through control finger 88, conductor 89, actuating coil Off, contact segment 20 of the torque relay 1, conductor 90, contact segment 74 of the speed relay 2, only when occupying position $z$, and conductor 91 to the negative battery conductor 87.

The relay device 2 automatically functions to maintain a substantially constant main-machine speed in the following manner: assuming that the main-machine speed tends to reach a higher than normal value by reason of the vehicle descending a grade, for example, the consequent strengthening of the main-armature voltage, which is accompanied by an increase of the excitation provided by the relay field winding 72, causes the relay device 2 to move to its position $z$, whereby the previously traced circuits of both the On and the Off coil are energized. In this way, a forward or main-field-strengthening movement of the controller 4 occurs with the result that the main-machine speed is reduced to correspond to the increased main field-excitation.

On the other hand, if the vehicle speed tends to fall below the value for which the resistor R5 is set by the master controller, then the weakening of the relay device field winding 72 permits the differentially-related field winding 71 to actuate the relay device 2 in the opposite direction to its position $x$, whereby both of the coils On and Off are deënergized to cause a backward or main-field-reducing movement of the controller 4. Consequently, the weakened main field-excitation causes the main-machine speed to increase to the desired normal value.

As hereinbefore mentioned, when the speed relay 2 occupies its normal intermediate position $y$, no movement of the controller 4 occurs, since the Off coil is deënergized.

Similarly to the previously-described master controller MC of Fig. 4, the present master controller MC1 is provided with positions $a'$ and $b'$ corresponding to the removal of "slack" from the train, during which period the whole, or the major portion, of the resistor R3 is short-circuited to prevent the main-machine torque from exceeding a certain medium or relatively low value, as already explained, while positions $c'$ and $d'$ are provided to permit of gradual increase to full main-machine torque operation after the slack has been taken out of the train, such action being accomplished by gradually removing the short-circuit of the resistor R3.

In addition, the resistor R5 may be gradually inserted in circuit by the train operator as the master controller MC2 is actuated through its successive positions $e'$ to $h'$, inclusive, by means of a set of control fingers 95 for successively engaging a contact segment 96, whereby the excitation of the relay field winding 72 is gradually reduced to effect a selected increased speed of the main machines by permitting the main-field-winding excitation to decrease to values corresponding to higher-speed operation, as will be understood.

The torque relay 1 again functions to prevent increases of main-machine torque beyond the values respectively corresponding to the adjustment of the resistor R3 during both the "slack"-removing and the fully operative machine conditions, as hereinbefore explained.

The system just described, therefore, effects an automatic maintenance of a preselected or adjustable main-machine speed and a prevention of excessive main-machine torques at all times.

Reference may now be had to Fig. 6, wherein a system for concurrently varying the main-machine torque settings and speed values is shown. In general, the modified system involves a combination of the master controllers MC1 and MC2 of Fig. 5 into a single master controller MC3, although, in addition, a regulating feature that is shown in Fig. 4 is also incorporated in the new controller. In the interests of simplicity and clearness, only the regenerative side of the master controller MC3 is shown, and it will be understood that, for accelerating operation, a counterpart of the illustrated portion of the controller is provided upon the opposite side of the control fingers, as illustrated in Fig. 4 and in Fig. 5.

The master controller MC3 is adapted to occupy four sets of positions which are designated as $a'$ to $d'$, inclusive, to correspond with the reference characters that are employed in Fig. 5. The respective groups or sets of positions may correspond to machine speed values of 10, 20, 30 and 40 miles per hour, for example. Each group comprises three notches or control steps which are respectively marked 10L, 10H and 10L', in the case of group $a'$, corresponding respectively to low-torque operation, high-torque operation and temporary low-torque operation during the transition to the next higher speed value.

The low-torque operation in each group of positions is effected by bridging control fingers 60 and 61 by contact segments 63, 63ª, etc., whereby the torque-regulating resistor R3 is short-circuited to produce the desired low-torque operation, as previously explained in connection with Fig. 4. For high-torque operation, the resistor R3 is inserted in circuit in position 10H, for example, whereby the desired increased main-machine torque is provided.

Instead of directly changing from high-torque operation at 10 miles per hour to low-torque operation at 20 miles per hour, it is desirable, as regards smoothness of car operation and reduction of current surges, to momentarily reduce the value of the main-machine torque just prior to movement of the master controller MC3 from group $a'$ to group $b'$. Such operation is effected by reason of the peculiar relation of contact segments in the illustrated controller, since the initial speed operation of 10 miles per hour, corresponding to group $a'$, effects a complete short-circuit of the speed-regulating resistor R5, as previously explained in connection with Fig. 5, and such short-circuit is maintained in positions 10L, 10H and 10L' of the controller.

However, in transition position 10L', a contact segment $63^a$ bridges the control fingers 60 and 61 to again short-circuit the torque-regulating resistor R3. The main-machine torque is thus momentarily reduced, and movement of the master controller to position 20L, the initial position in group $b'$, removes the short-circuit from one section of the speed-regulating resistor R5, whereby main-circuit conditions are readjusted to effect a machine speed of 20 miles per hour.

In this way, a smooth and efficient torque transition is effected throughout the entire speed range of the main machines, further contact segments $63^b$ and $63^c$ being provided for producing low-torque or high-torque operation under normal running conditions and momentary low-torque operation during transition from 20 to 30 miles per hour and from 30 to 40 miles per hour, as will be understood without further discussion.

I do not wish to be restricted to the specific circuit connections or arrangement of parts herein set forth, as various further modifications thereof may be effected without departing from the spirit and scope of my invention. I desire, therefore, that only such limitations shall be imposed as are indicated in the appended claims.

I claim as my invention:

1. In a system of control, the combination with a dynamo-electric machine, of means for manually varying the machine torque through materially different operating ranges, and means for automatically modifying the machine torque when undesirable values thereof obtain.

2. In a system of control, the combination with a dynamo-electric machine, of a manual controller having different groups of positions corresponding to different torque ranges of said machine, and automatic means coöperating with said controller for modifying the machine torque when undesirable values thereof obtain.

3. In a system of control, the combination with a dynamo-electric machine, of means for automatically limiting the machine torque, and a manual controller having different groups of positions for adjusting said automatic means in accordance with different periods of machine operation.

4. In a system of control, the combination with a dynamo-electric machine, of relay means having windings respectively energized in accordance with certain machine conditions for automatically limiting the machine torque, and a manual controller having an initial group of positions for adjusting said relay means to effect relatively low machine-torque operation and having a succeeding group of positions for adjusting said relay means to effect relatively high machine-torque conditions.

5. In a system of control, the combination with a dynamo-electric machine connected in circuit to inherently produce increased torque with decreased speed over a certain operating range, of means for manually varying the machine torque, and means for automatically preventing the torque from exceeding a predetermined value.

6. In a system of control, the combination with a dynamo-electric machine connected in circuit to inherently produce increased torque with decreased speed over a certain operating range, of a manual controller having groups of positions corresponding to materially different torque requirements, and automatic means dependent upon the controller position for preventing the torque from exceeding respectively predetermined values.

7. In a system of control, the combination with a dynamo-electric machine connected in circuit to inherently produce increased torque with decreased speed over a certain operating range, a manual controller having groups of positions corresponding to materially different torque requirements, and relay means having windings respectively energized in accordance with certain machine conditions for preventing the torque from exceeding respectively predetermined values, said relay means being adjustable by said controller.

8. In a system of control, the combination with a dynamo-electric machine having an armature and a field winding, of auxiliary means for exciting said field winding, regulating means for said auxiliary means to vary the machine torque, means for manually effecting the operation of said regulating means through materially different machine-speed ranges, and means for automatically modifying the machine torque when undesirable values thereof obtain.

9. In a system of control, the combination with a dynamo-electric machine having an armature and a field winding and connected in circuit to inherently produce increased torque with decreased speed over a certain operating range, of an auxiliary source of energy for said field winding, a regulating device for said source to vary the machine torque, a manual controller for governing said regulating device and having groups of positions corresponding to materially different torque requirements, and automatic relay means dependent upon the controller position for preventing the torque from exceeding respectively predetermined values.

10. In a system of control, the combination with a dynamo-electric machine, of means for manually varying the machine torque through materially different operating ranges, means for automatically modifying the machine torque under predetermined conditions, and means for automatically maintaining a predetermined machine speed.

11. In a system of control, the combination with a dynamo-electric machine, of a manual controller having different groups of positions corresponding to different torque ranges of said machine, automatic means coöperating with said controller for modifying the machine torque under predetermined conditions, and other automatic means associated with its first automatic means for maintaining a predetermined machine speed.

12. In a system of control, the combination with a supply circuit and a dynamo-electric machine having an armature and a field winding, of relay means having windings energized in accordance with certain machine conditions for automatically limiting the machine torque, a second relay means having windings differentially energized responsively to the supply-circuit voltage and to the main-field-winding voltage, respectively, for automatically maintaining a predetermined machine speed, and a plurality of independent manual controllers severally having an initial group of positions for adjusting said relay means to respectively effect relatively low machine torque and speed operation and having a succeeding group of positions for adjusting said relay means to respectively effect relatively high machine torque and speed operation.

13. In a system of control, the combination with a dynamo-electric machine connected in circuit to inherently produce increased torque with decreased speed over a certain operating range, means for manually varying the machine torque, means for automatically preventing the torque from exceeding a predetermined value, and means for automatically maintaining various selected machine speeds.

14. In a system of control, the combination with a dynamo-electric machine connected in circuit to inherently produce increased torque with decreased speed over a certain operating range, a manual controller having groups of positions corresponding to materially different torque requirements, automatic means dependent upon the controller position for preventing the torque from exceeding respectively predetermined values, and other automatic means also dependent upon the controller position for maintaining a corresponding machine speed.

15. In a system of control, the combination with a supply circuit and a main dynamo-electric machine having an armature and a field winding and connected in circuit to inherently produce increased torque with decreased speed over a certain operating range, of an auxiliary source of energy for said field winding, a regulating device for said source to vary the machine torque, a manual controller for governing said regulating device and having groups of positions corresponding to materially different torque requirements, a motor-type relay device having an armature and a field winding respectively energized in accordance with main-armature current and main-field-winding voltage for preventing the main-machine torque from exceeding predetermined values dependent upon the controller position, and a second motor-type relay device having an armature and a field winding energized responsively to the main-field-winding voltage and having another field winding differentially energized in accordance with the supply-circuit voltage for maintaining various values of machine speed dependent upon the controller position.

16. In a system of control, the combination with a dynamo-electric machine, of means for automatically modifying the machine torque under predetermined conditions, means for automatically maintaining a series of selected machine speeds, and means for manually effecting a decrease of torque during transition from one speed to another.

17. In a system of control, the combination with a supply circuit and a dynamo-electric machine having an armature and a field winding, of relay means having windings energized in accordance with certain machine conditions for automatically limiting the machine torque, a second relay means having windings differentially energized responsively to the supply-circuit voltage and to the main-field-winding voltage, respectively, for automatically maintaining a series of selected machine speeds, and a manual controller for effecting variations of machine torque during operation at each speed and for temporarily decreasing the torque just prior to transition from any speed to a higher speed.

18. In combination, a dynamo-electric machine having a field winding connected in series with its armature, a separately controllable source of potential connected across said series field, and automatic means for controlling the potential supplied by said source arranged to hold the torque produced by said dynamo-electric machine constant when the latter is driven as a generator.

19. In combination, a series dynamo-electric machine, an exciter, means for connecting the armature of said exciter across the series field winding of said dynamo-electric machine, and an automatic regulator for controlling the excitation of said exciter to maintain a substantially constant machine torque.

20. In a system of control, the combination with a dynamo-electric machine connected in circuit to inherently produce increased torque with decreased speed over a certain operating range, means for automatically preventing the torque from exceeding a predetermined value, and means for automatically maintaining various selected machine speeds.

21. In a system of control, the combination with a dynamo-electric machine connected in circuit to inherently produce increased torque with decreased speed over a certain operating range, means for manually varying the machine torque, and means for automatically maintaining various selected machine speeds.

In testimony whereof, I have hereunto subscribed my name this 25th day of Sept. 1917.

RUDOLF E. HELLMUND.